United States Patent
Motomiya

(10) Patent No.: US 9,397,439 B2
(45) Date of Patent: Jul. 19, 2016

(54) POWER FEED CONNECTOR

(71) Applicant: MURAKAMI CORPORATION, Shizuoka (JP)

(72) Inventor: Masahiro Motomiya, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 527 days.

(21) Appl. No.: 13/680,554

(22) Filed: Nov. 19, 2012

(65) Prior Publication Data

US 2013/0200723 A1 Aug. 8, 2013

(30) Foreign Application Priority Data

Feb. 3, 2012 (JP) ................................ 2012-021666

(51) Int. Cl.
*H02M 3/07* (2006.01)
*H01R 13/53* (2006.01)
*H01R 13/66* (2006.01)
*H02K 5/22* (2006.01)
*H02K 11/02* (2016.01)
*H01R 24/68* (2011.01)
*H02K 16/00* (2006.01)

(52) U.S. Cl.
CPC ............ *H01R 13/53* (2013.01); *H01R 13/6625* (2013.01); *H02K 5/225* (2013.01); *H02K 11/024* (2013.01); *H01R 24/68* (2013.01); *H02K 16/00* (2013.01)

(58) Field of Classification Search
CPC .... H01R 13/53; H01R 13/6625; H01R 24/68; H02K 11/024; H02K 5/225; H02K 16/00
USPC ......................................................... 307/109
See application file for complete search history.

(56) References Cited

U.S. PATENT DOCUMENTS

| | | | | |
|---|---|---|---|---|
| 5,233,246 A * | 8/1993 | Yockey | .................. | H02K 5/225 310/68 D |
| 6,300,696 B1 * | 10/2001 | Wong | ..................... | H02K 5/145 310/239 |
| 6,348,752 B1 * | 2/2002 | Erdman | ................. | H02K 11/40 310/194 |
| 2003/0067226 A1 * | 4/2003 | Matsushita | .............. | H02K 5/15 310/40 MM |
| 2009/0215293 A1 * | 8/2009 | Hori | ................... | H01R 13/7195 439/84 |

FOREIGN PATENT DOCUMENTS

| | | |
|---|---|---|
| JP | 11-86980 | 3/1999 |
| JP | 2005-347007 | 12/2005 |
| JP | 4160573 | 7/2008 |
| JP | 4737032 | 7/2011 |

* cited by examiner

*Primary Examiner* — Thienvu Tran
*Assistant Examiner* — David M Stables
(74) *Attorney, Agent, or Firm* — Greenblum & Bernstein, P.L.C.

(57) ABSTRACT

The number of components can be reduced and the fittability can be improved so that reduction in the cost can be realized. A power feed connector for feeding power to a motor provided in an actuator includes: two motor current application terminals for applying a current to the motor; two capacitor contact portions; a capacitor for applying a current to the capacitor contact portions respectively; and a housing to which the two motor current application terminals, the two capacitor contact portions, and the capacitor are fitted, wherein each of the motor current application terminals includes an extension portion and a connection portion for applying a current to the motor, and wherein each of the capacitor contact portions protrudes from the extension portion.

5 Claims, 15 Drawing Sheets

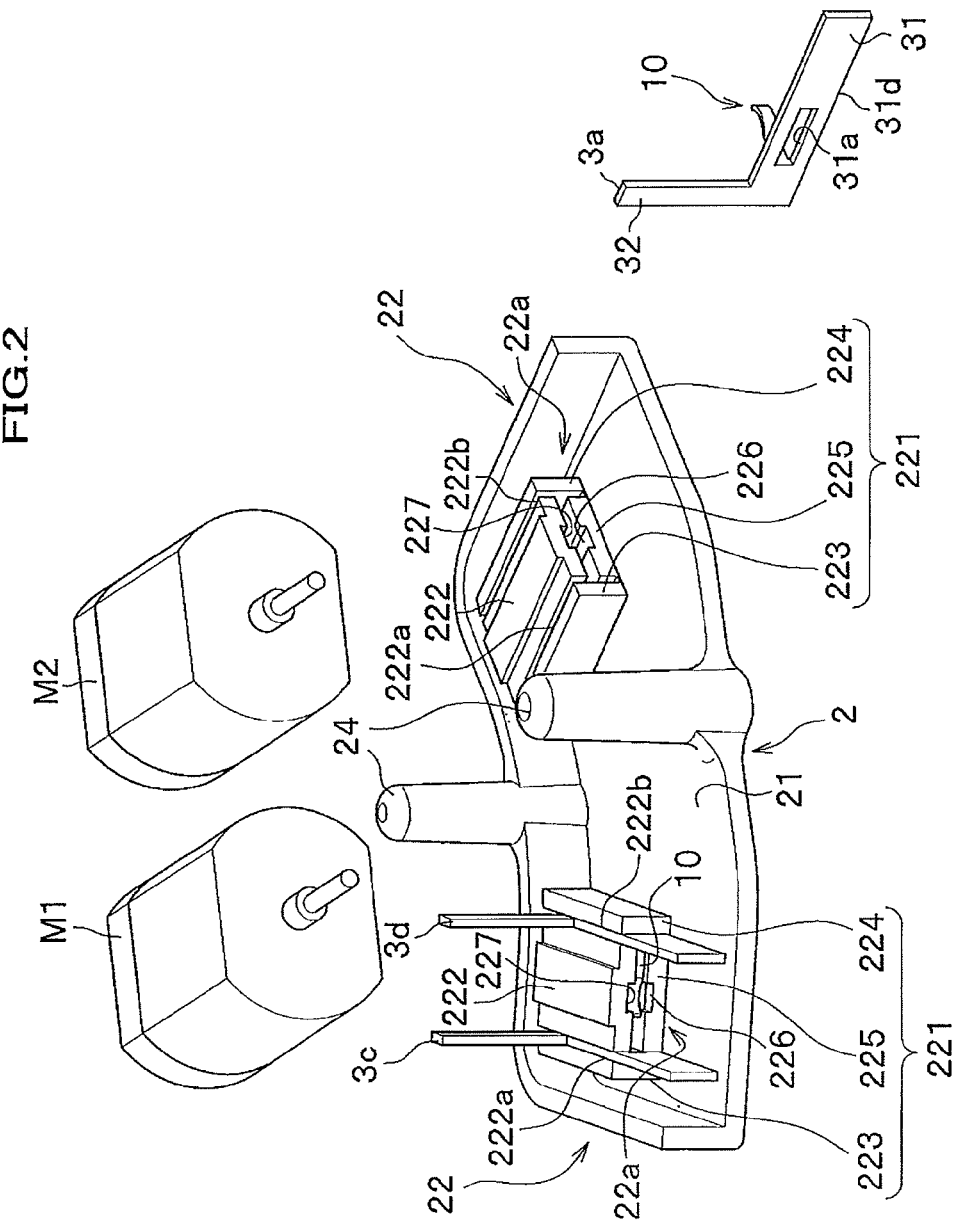
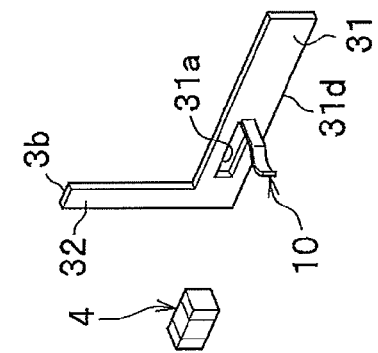
FIG.2

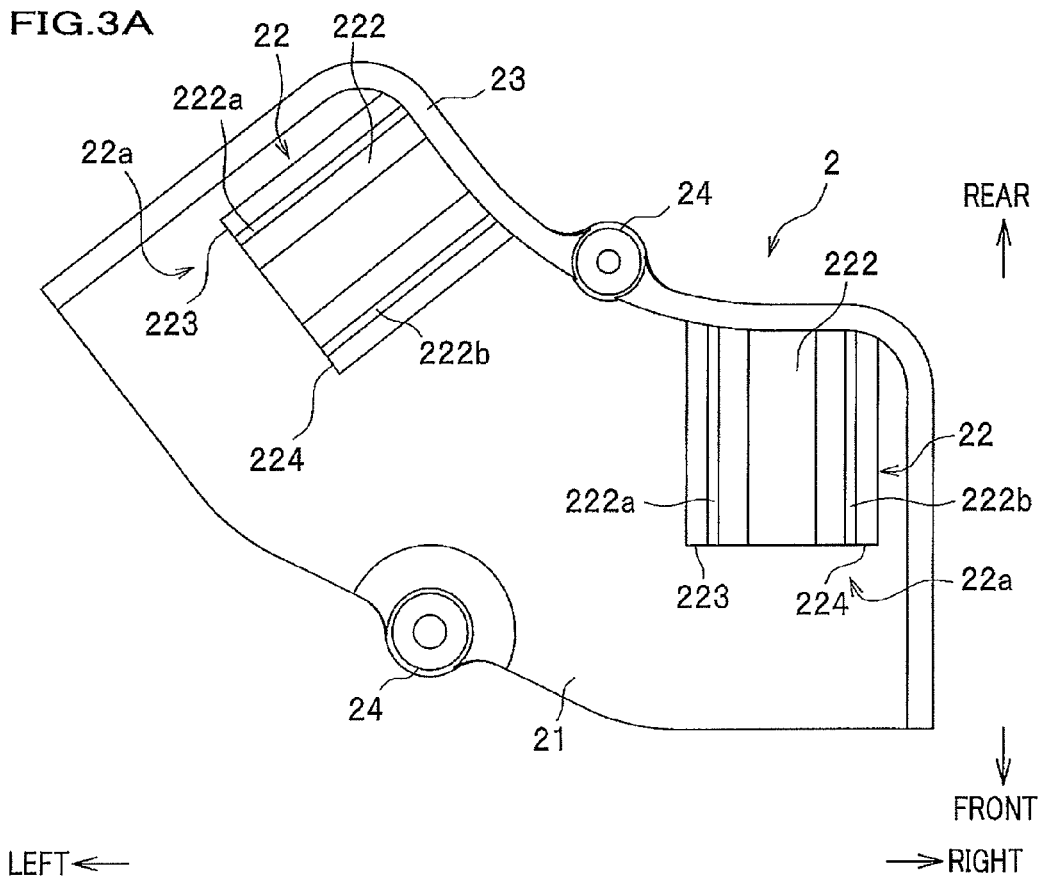
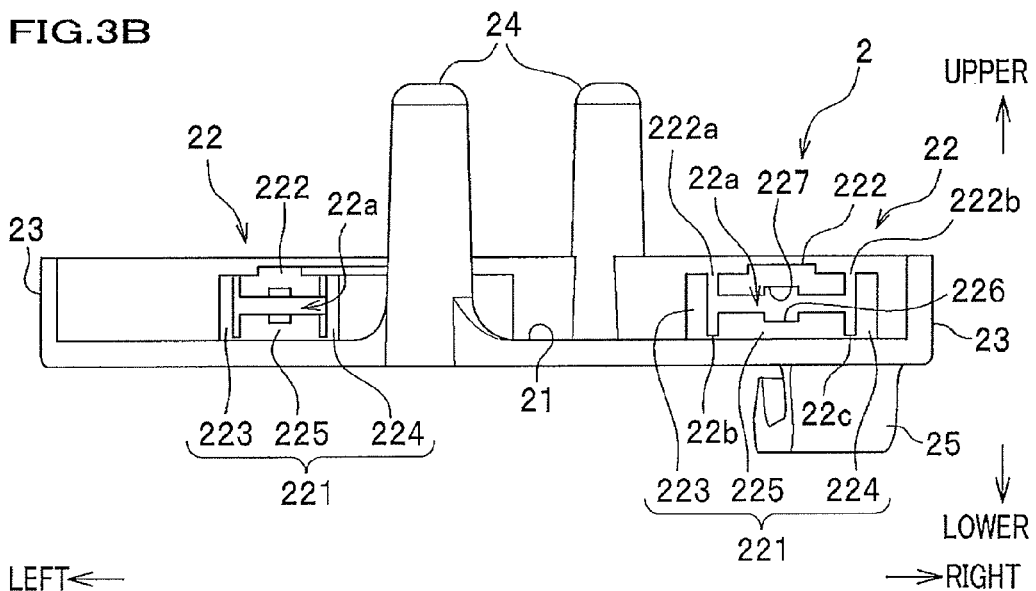

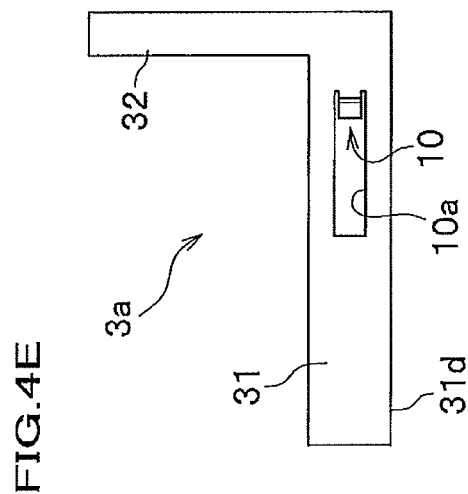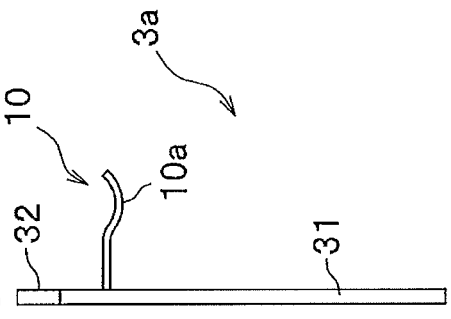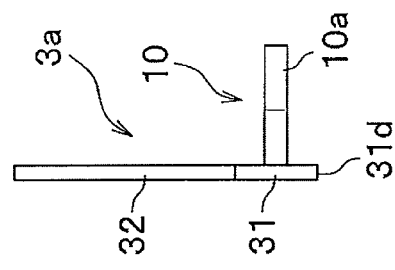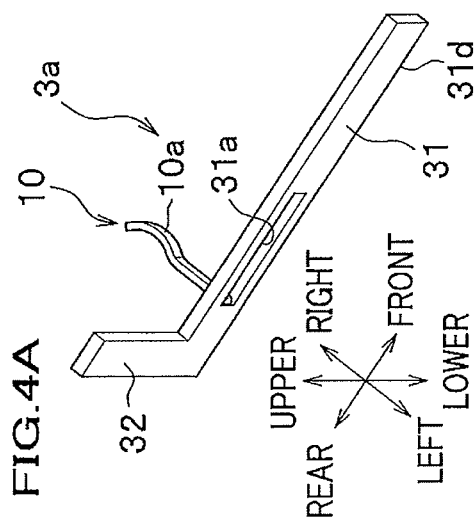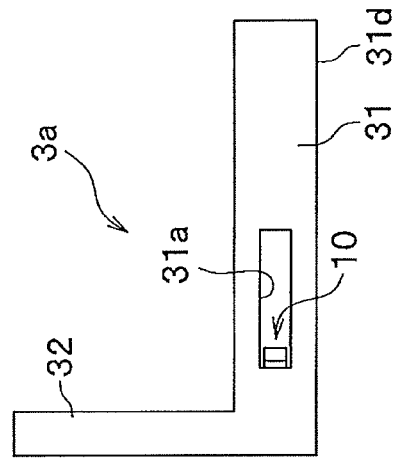

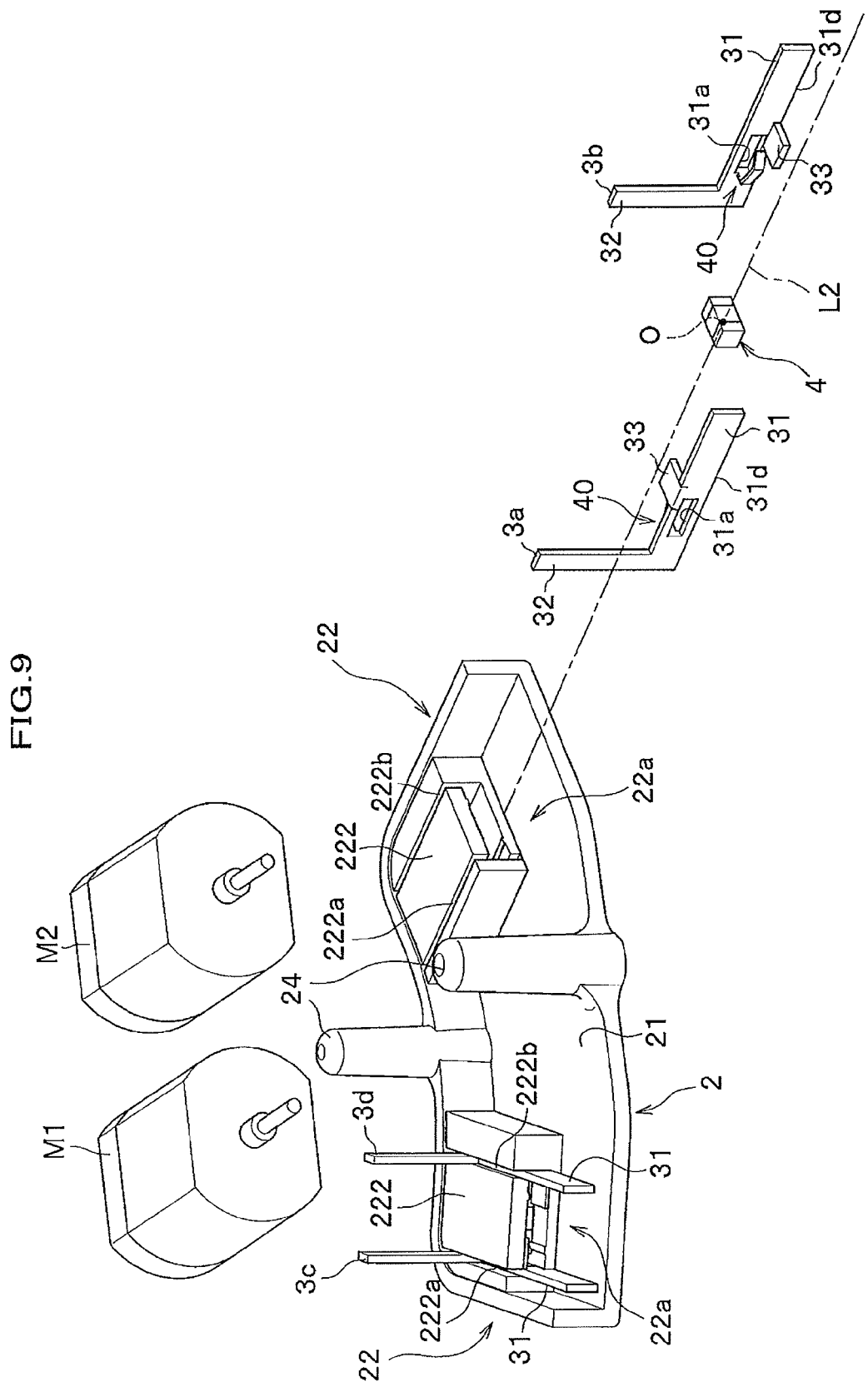

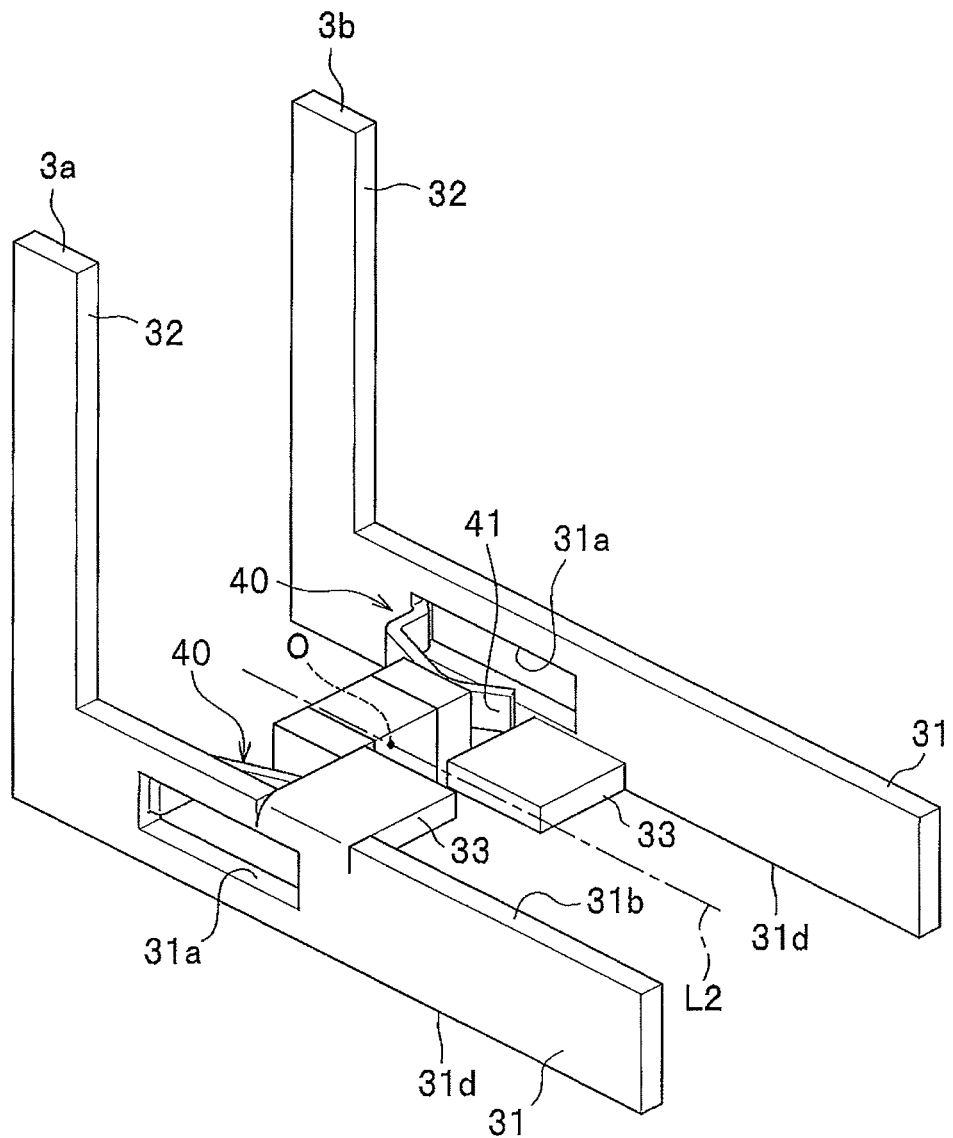

POWER FEED CONNECTOR

CROSS REFERENCE TO RELATED APPLICATION

This application claims the priority of Japanese Patent Application No. 2012-021666, filed on Feb. 3, 2012, the entire specification, claims and drawings of which are incorporated herewith by reference.

BACKGROUND OF THE INVENTION

1. Field of the Invention

The present invention relates to a power feed connector for feeding power to a motor provided in an actuator.

2. Description of the Related Art

Conventionally, for example, an outer mirror of an automobile is provided with an actuator for adjusting the angle of the mirror surface, and the actuator has a motor as a driving source mounted therein.

In some cases, an outer mirror or the periphery thereof is provided with electronic devices (e.g., a variety of sensors or a camera, etc.). In such a case, a noise from the above-described motor may cause disturbance to a variety of signals which are transmitted to the above-described sensors or the camera. As a solution to such a noise, a capacitor is provided as a noise filter between a power supply wire for the motor and a ground wire.

In general, in case of wiring for a capacitor, the coating of a power source wire and the coating of a ground wire are peeled off at the middle, and a capacitor is soldered between the two wires. Consequently, it is possible that a connector has a large size and the capacitor falls off from the soldered portion.

Further, since processing (e.g., winding an insulation tape onto the peeled-off portion) is needed to coat the peeled-off portion, the work efficiency is dropped in many work processes.

On the other hand, as a power feed connector structure which requires no work (e.g., soldering) at the time of mounting a capacitor, Patent Literature 1 (Japanese Patent No. 4160573) discloses a power feed connector.

This power feed connector includes two motor current application terminals for applying a current to a motor, two capacitor terminals, a capacitor for applying a current to the capacitor terminals respectively, and a housing to which the two motor current application terminals, two capacitor contact portions, and the capacitor are fitted.

SUMMARY OF THE INVENTION

According to Patent Literature 1, in assembling a power feed connector, it is necessary to fit two motor current application terminals, two capacitor contact portions, and a capacitor to the housing. Consequently, there is a problem that the number of components is large and the fitting work is complicated, which leads to an increase in the cost.

The present invention has been developed for addressing these points, and an object of the present invention is to provide a power feed connector which attains a reduction in the number of components and improvement in the fittability, which realizes a reduction in the cost.

According to the present invention, a power feed connector for feeding power to a motor provided in an actuator includes: two motor current application terminals for applying a current to the motor; two capacitor contact portions; a capacitor for applying a current to the capacitor contact portions respectively; and a housing to which the two motor current application terminals, the two capacitor contact portions, and the capacitor are fitted, wherein each of the motor current application terminals includes an extension portion and a connection portion for applying a current to the motor, and wherein each of the capacitor contact portions protrudes from the extension portion.

According to the present invention, since it is not necessary to fit the capacitor contact portions as a separate work, and a current can be applied to the capacitors by a simple work of fitting the motor current application terminals to the housing respectively. Thus, it is possible to attain a reduction in the number of components and improvement in the fittability, which realizes a reduction in the cost.

Further, in the power feed connector according to the present invention, in a state that the motor current application terminals are fitted to the housing respectively, one and another of the capacitor contact portions are disposed with a gap therebetween in a direction of fitting the two motor current application terminals to the housing, and the capacitor is sandwiched by both of the capacitor contact portions.

According to the present invention, for example, the capacitor can be easily sandwiched between both of the capacitor contact portions by just carrying out a fitting work from one direction so as to fit one motor current application terminal to the housing, then fit the capacitor, and then fit another motor current application terminal. Thus, excellent fittability can be attained, and a further reduction in the cost can be realized.

Still further, in the power feed connector according to the present invention, in a state that the motor current application terminals are fitted to the housing respectively, one and another of the capacitor contact portions are disposed with a gap therebetween in a direction perpendicular to a direction of fitting the two motor current application terminals to the housing, and the capacitor is sandwiched by both of the capacitor contact portions.

According to the present invention, for example, the capacitor can be sandwiched by the two capacitor contact portions by fitting the motor current application terminals to the housing respectively and then fitting the capacitor so as to be positioned between the two capacitor contact portions. Thus, excellent fittability can be attained, and a further reduction in the cost can be realized.

Yet further, in the power feed connector according to the present invention, in a state that the motor current application terminals are fitted to the housing respectively, both of the capacitor contact portions are arranged to be line-symmetric to each other with respect to a reference line passing through a center of the capacitor.

According to the present invention, for example, it is possible to form both of the capacitor contact portions by the same device or tool and by the same process, which realizes a reduction in the cost. Further, standardization of machined parts can be attained to realize a reduction in the cost.

Further, since both of the capacitor contact portions are arranged to be line-symmetric to each other with respect to the reference line passing through the center of the capacitor, the capacitor contact portions can hold the capacitor with an appropriate balance. Thus, the capacitor contact portions can maintain a satisfactory contact with the capacitor.

Further, the power feed connector according to the present invention further includes: two auxiliary contact portions each of which protrudes from the corresponding extension portion to the same side with a side to which the contact portion protrudes, and contacts with a side surface of the capacitor, wherein the reference line passing through a center of the capacitor is parallel to a direction of fitting the motor current application terminals to the housing.

According to the present invention, the auxiliary contact portions contact with the capacitor and it is thereby possible to prevent the capacitor from deviating from a predetermined position of the housing.

Still further, in the power feed connector according to the present invention, in the state that the motor current application terminals are fitted to the housing respectively, both of the auxiliary contact portions are arranged to be line-symmetric to each other with respect to the reference line.

According to the present invention, for example, also for a structure including the auxiliary contact portions, it is possible to form both of the motor current application terminals by the same device or tool and by the same process, which realizes a reduction in the cost.

Further, since the auxiliary contact portions are arranged to be line-symmetric to each other with respect to the reference line passing through the center of the capacitor, it is possible to hold (urge) the capacitor with an excellent balance.

According to the present invention, it is possible to obtain a power feed connector which enables a reduction in the number of components and improvement in the fittability to thereby realize a reduction in the cost.

BRIEF DESCRIPTION OF THE DRAWINGS

FIG. 2 is an exploded perspective view showing the structure of the power feed connector and motors connected to the power feed connector;

FIG. 3A is a plan view showing a housing, and FIG. 3B is a front view of the same;

FIGS. 4A to 4E show one motor current application terminal, wherein FIG. 4A is a perspective view, FIG. 4B is a front view, FIG. 4C is a plan view, FIG. 4D is a left side view, and FIG. 4E is a right side view;

FIGS. 5A to 5E show another motor current application terminal, wherein FIG. 5A is a perspective view, FIG. 5B is a front view, FIG. 5C is a plan view, FIG. 5D is a left side view, and FIG. 5E is a right side view;

FIG. 9 is an exploded perspective view showing the structure of a power feed connector and motors connected to the power feed connector in a second embodiment according to the present invention;

FIGS. 11A to 11F show one motor current application terminal, wherein FIG. 11A is a perspective view, FIG. 11B is a front view, FIG. 11C is a plan view, FIG. 11D is a left side view, FIG. 11E is a right side view, and FIG. 11F is a bottom view;

FIGS. 12A to 12F show another motor current application terminal, wherein FIG. 12A is a perspective view, FIG. 12B is a front view, FIG. 12C is a plan view, FIG. 12D is a left side view, FIG. 12E is a right side view, and FIG. 12F is a bottom view;

FIG. 15 is a perspective view showing a connection state between the capacitor connection portion, the capacitor, and the motor current application terminals.

DETAILED DESCRIPTION OF THE PREFERRED EMBODIMENTS

Figure 1:
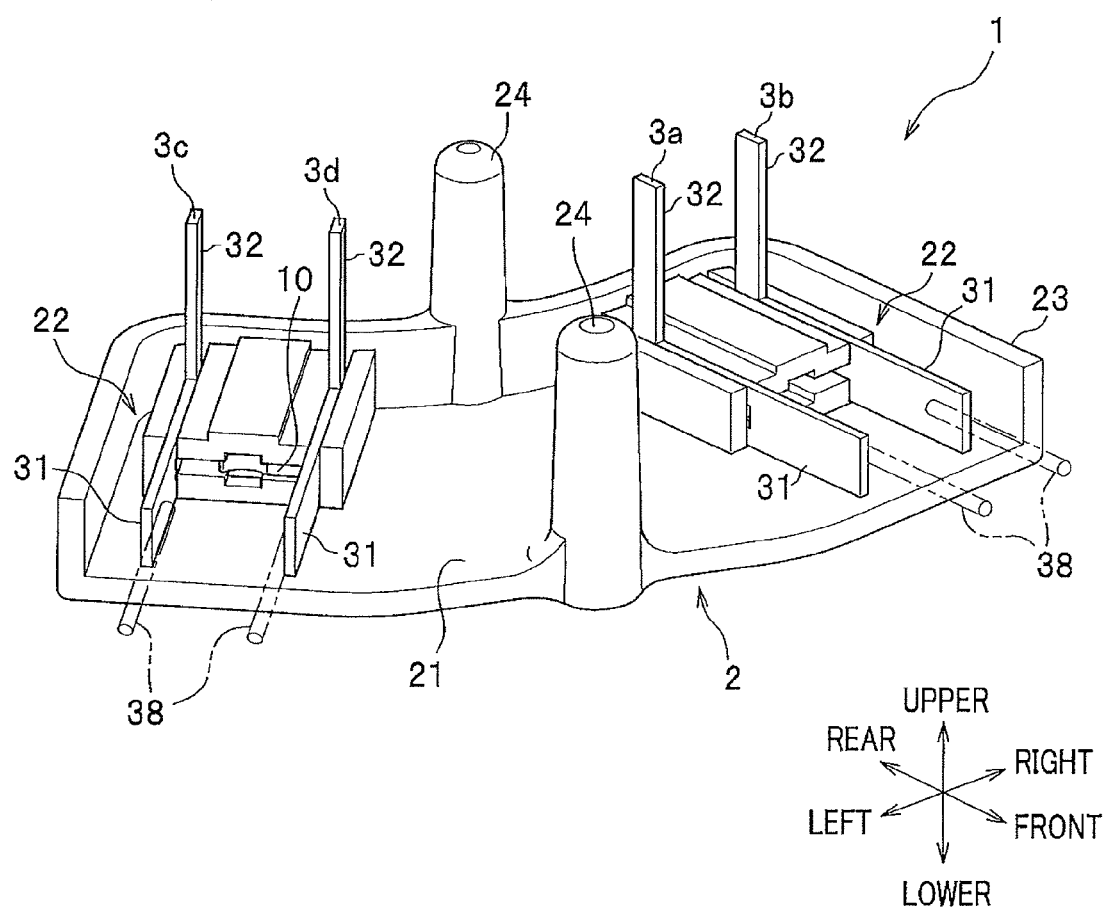
FIG. 1 is a perspective view showing a power feed connector in a first embodiment according to the present invention.
Figure 5E:
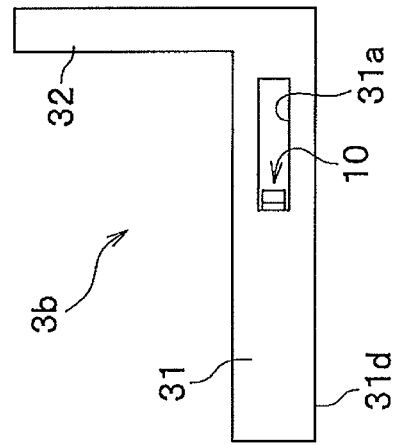
Figure 5C:
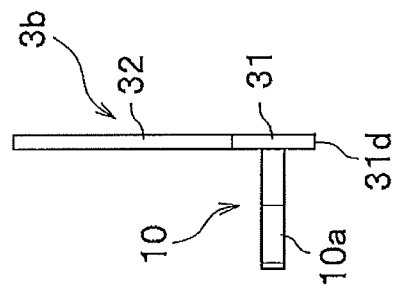
Figure 5B:
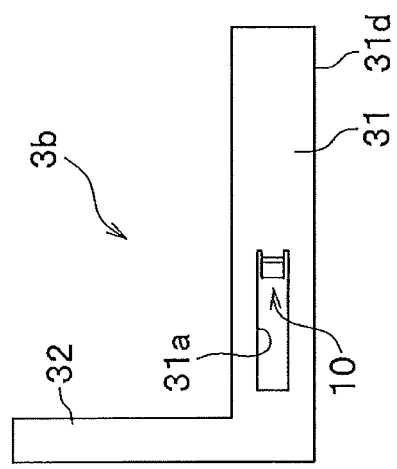
Figure 5A:
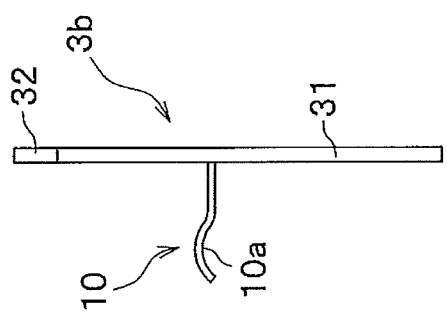
Figure 5D:
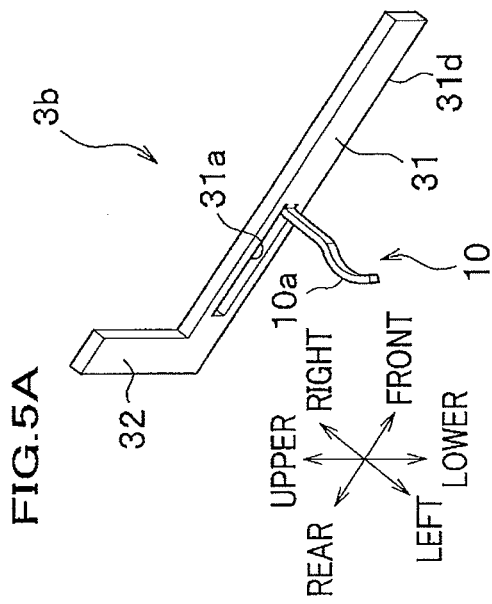

With reference to the attached drawings, embodiments will be described below, in which the present invention is applied to feeding of power to the motor of a mirror-surface-angle adjustment mechanism (actuator) of an outer mirror fitted to the vehicle body of an automobile or the like. In the description, when "front/rear, left/right, upper/lower" are referred, directions shown in FIG. 1 are taken as reference directions. Herein, "front/rear, left/right, upper/lower" do not necessarily agree with "front/rear, left/right, upper/lower" of an outer mirror fitted to the vehicle body.

First Embodiment

As shown in FIG. 1, a power feed connector (hereinafter, referred to as "connector") 1 includes motor-current-application terminals 3a to 3d which are inserted and fixed in a housing 2 and have a substantial L-shape. The motor-current-application terminals 3a to 3d are arranged at predetermined positions of the housing 2 in parallel. Electrical wires 38 represented by alternate long and two short dashed lines are press fitted to the front ends of the motor-current-application terminals 3a to 3d respectively, and are connected to a power source supply side (not shown) and a ground side.

In the present embodiment, the motor-current-application terminals 3b, 3c arranged at both of the side end portions of the housing 2 are connected to the power supply side, and the motor-current-application terminals 3a, 3d arranged on the central side are connected to the ground side. These motor-current-application terminals 3a to 3d are electrically connected to a first and second motors M1, M2 (see FIG. 2) disposed above the housing 2, at standing portions (connection portions) 32 thereof which are along the upper/lower direction (the direction perpendicular to the fitting direction and perpendicular to the upper surface of a base portion 21 of the housing 2). The first and second motors M1, M2 are arranged in parallel in a mirror surface angle adjustment mechanism (not shown).

Figure 8:
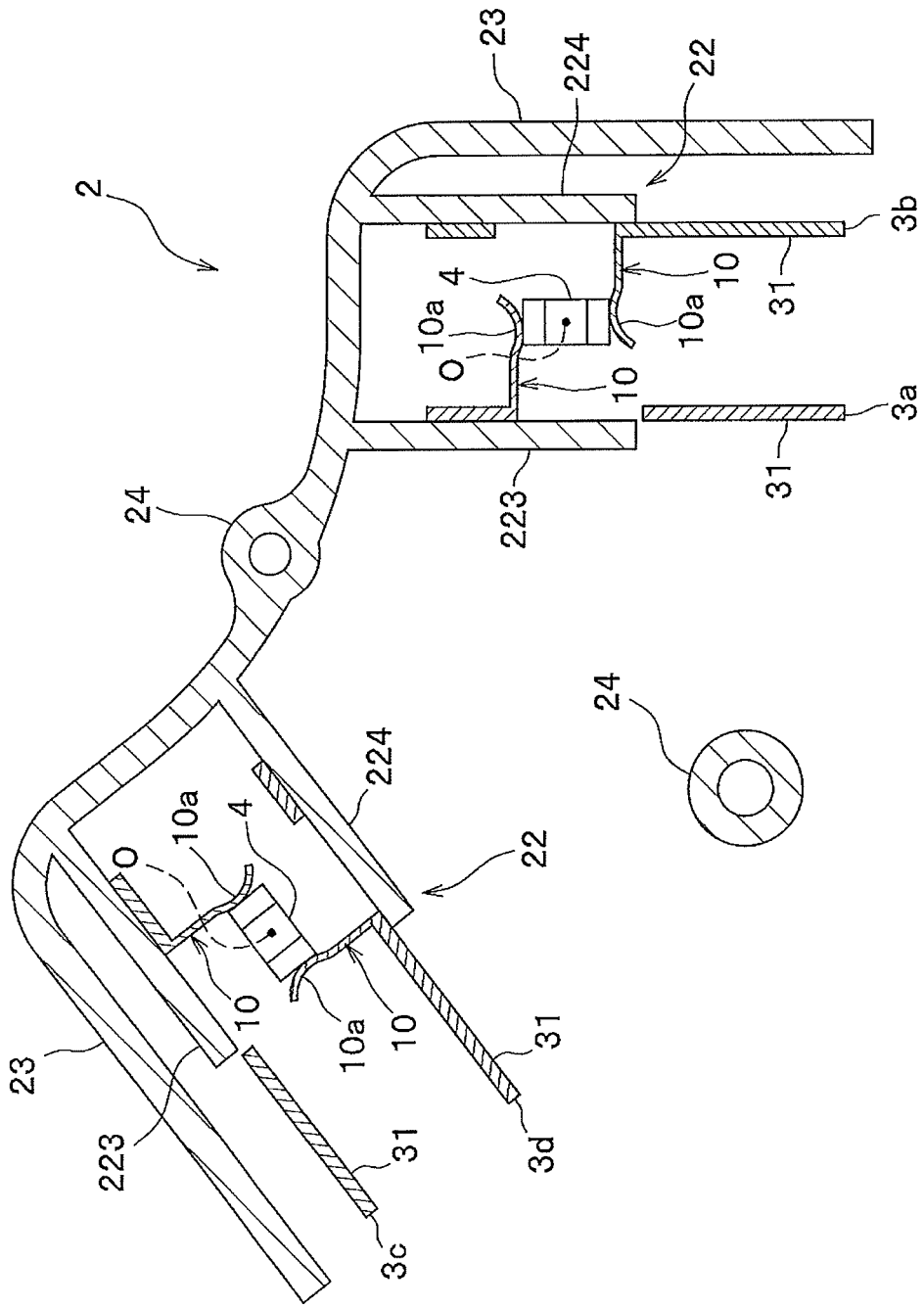
FIG. 8 is an end view taken along line A-A in FIG. 7.

In the housing 2, between the motor-current-application terminals 3a, 3b and between the motor-current-application terminals 3c, 3d, capacitors 4 are connected through capacitor contact portions 10, 10 respectively (see FIG. 8). In such a manner, the motor-current-application terminals 3a, 3b are electrically connected to each other through the capacitor contact portions 10, 10 and the capacitor 4. Likewise, on the other side, the motor-current-application terminals 3c, 3d are electrically connected to each other through the capacitor contact portions 10, 10 and the capacitor 4. That is, an arrangement is made so that noises generated from the first and second motors M1, M2 of the mirror surface angle adjustment mechanism are satisfactorily removed.

In the present embodiment, these motor-current-application terminals 3a to 3d and the capacitors 4 are configured, as described later, so as to be fitted along one direction through openings 22a formed on the front surface side of terminal housing portions 22 respectively.

The mirror surface angle adjustment mechanism (not shown) is provided with a holder on whose one side surface a mirror surface is arranged. For example, the mirror surface angle adjustment mechanism is configured to adjust the angle of the holder around the upper/lower axis by the first motor M1 and adjust the angle of the holder around the left/right axis by the second motor M2. On the other side surface of the holder, a connection portion for fixing a connector 1 in the present embodiment is provided. This connection portion is provided with the connection portions in which the motor-current-application terminals 3a to 3d are inserted and connected, the connection portions having a recessed shape where the connector 1 is attached and held.

The connector 1 will be explained below in detail.

As shown in FIG. 3A, the housing 2 includes a base portion 21 in a plate shape and terminal housing portions 22, 22 which are in a left/right pair and are provided on the upper surface of the base portion 21.

A marginal portion 23 is provided standing at the left and right side end portions and the rear end portion. Front and rear two pins 24, 24 are provided, standing at the left/right central portions of the base portion 21. The pins 24, 24 can be respectively inserted into holes (not shown) provided at the connection portion of the mirror surface angle adjustment mechanism. The pins 24, 24 function as position defining members to define the position of the connector 1 with respect to the connection position. The connection portion of the mirror surface angle adjustment mechanism is provided with latch hooks (not shown) capable of engagement with the left/right side portions or the like of the base portion 21, and the base portion 21 is fixed by these latch hooks to the connection portion to be prevented from dropping off.

As shown in FIG. 3B, a hook 25 is formed on the lower surface of the base portion 21 to hook electrical wires 38.

Since the terminal housing portions 22, 22 have similar structures on the left and the right, one (on the right side) terminal housing portion 22 where the motor-current-application terminals 3a, 3b (see FIG. 2) are arranged will be described below.

As shown in FIG. 3B, the terminal housing portion 22 is in a box shape provided with an opening 22a on the front surface side, and includes a housing portion 221 substantially in a U-shape in a front view and a lid portion 222 disposed facing the surface of the housing portion 221.

The housing portion 221 includes a left wall portion 223, a right wall portion 224, and a recessed groove portion 225 formed between the left wall portion 223 and the right wall portion 224. Cutout portions 22b, 22c extending in the front/rear direction are formed between the left wall portion 223 and the recessed groove portion 225 and between the right wall portion 224 and the recessed groove portion 225. The lower edges 31d (see FIGS. 4A to 4E and FIGS. 5A to 5E) of extension portions 31 are inserted into the cutout portions 22b, 22c when the motor-current-application terminals 3a, 3b are housed into the terminal housing portion 22.

A groove 226 in an angled shape extending in the front/rear direction is formed on the upper surface of the recessed groove portion 225.

The lid portion 222 extends to the front surface side in a state of being supported at one end thereof by the marginal portion 23 at the rear end portion of the base portion 21, and is arranged in the upper-surface opening of the housing portion 221. A gap 222a is formed between the lid portion 222 and the left wall portion 223, and a gap 222b is formed between the lid portion 222 and the right wall portion 224. The standing portions 32, 32 of the motor-current-application terminals 3a, 3b are respectively inserted into the gaps 222a, 222b.

Figure 7:
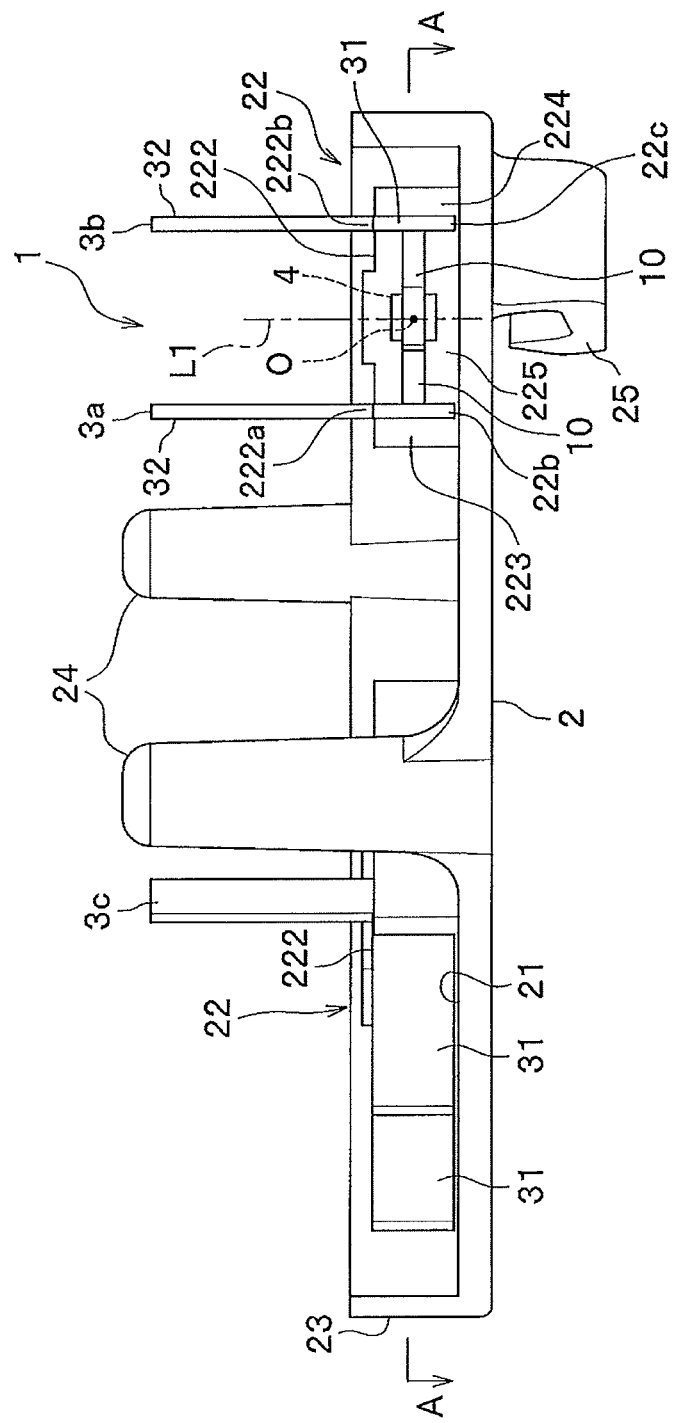
FIG. 7 is a front view of the power feed connector.

An angled groove 227 is formed on the lower surface of the lid portion 222, facing the groove 226 of the recessed groove portion 225. As shown in FIG. 7, the capacitor 4 is held in the spatial portion which is surrounded by these grooves 226, 227 with a gap along the upper/lower direction.

As shown in FIG. 2, the capacitor 4 is in a rectangular parallelepiped shape and is housed in the space portion in a state that the longitudinal direction thereof is along the extending direction of the grooves 226, 227. That is, the grooves 226, 227 face each other in the upper/lower direction with a gap which corresponds to the size, along the short-length direction, of the capacitor 4.

The two motor-current-application terminals 3a, 3b are made from a plate-shaped conductive material and are provided with the extension portions 31 and the standing portions 32 respectively. The capacitor contact portions 10 are formed integrally with the extension portions 31, 31 respectively and protrude from the extension portions 31, 31. Otherwise, capacitor contact portions 10 may be formed of a different material and fitted to the extension portions 31.

Figure 6:
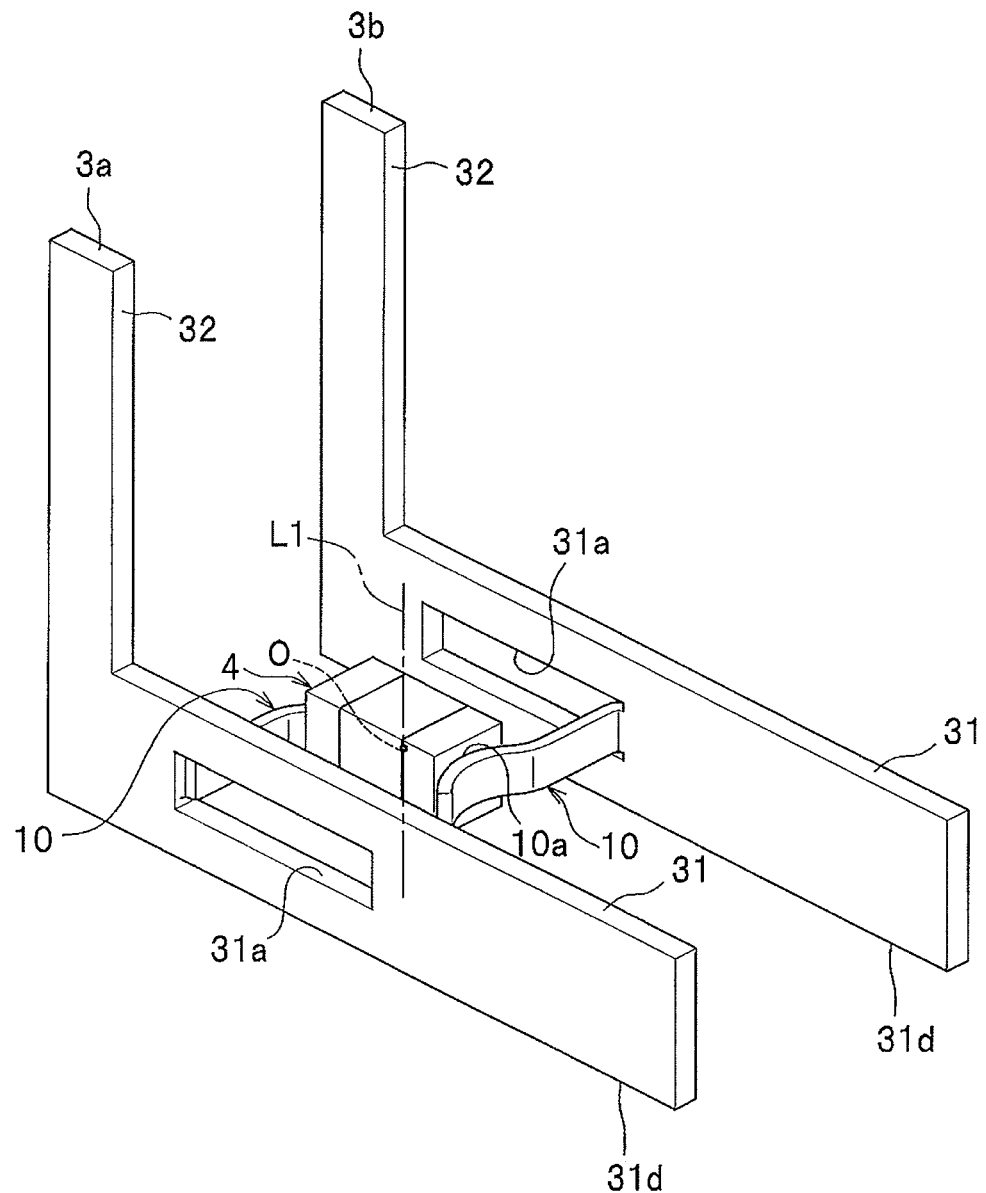
FIG. 6 is a perspective view showing a connection state between the motor current application terminals and the capacitor.

As shown in FIG. 2 and FIG. 6, the capacitor contact portions 10, 10 protrude along the direction in which the motor-current-application terminals 3a, 3b face each other. The capacitor contact portions 10, 10 are disposed with a gap therebetween in the front/rear direction so as to surround the reference line L1 which passes through the center O of the capacitor 4. That is, in a state the motor-current-application terminals 3a, 3b are arranged in the housing 2, the two capacitor contact portions 10, 10 are arranged to be line-symmetric to each other with respect to the reference line L1 passing through the center O of the capacitor 4, wherein the reference line L1 is a line (a line parallel to the extension portions 31) which is perpendicular to the upper surface of the base portion 21 and passes through the center O of the capacitor 4 (see FIG. 7). Accordingly, there is a relationship that, when one capacitor contact portion 10 were rotated by 180 degrees (in plan view shown in FIG. 8) around the axis of symmetry (reference line L1), the one capacitor contact portion 10 would overlap with another capacitor contact portion 10.

The capacitor contact portions 10, 10 are made of a plate-shaped piece which is formed in a size to be inserted between the recessed groove portion 225 of the terminal housing portion 22 and the lid portion 222, wherein the arc-shaped protrusion portion 10a, 10a thereof contact with the side surfaces of the capacitor 4 respectively (see FIG. 8).

Such a capacitor contact portion 10 can be formed, for example, by stamping the extension portion 31 along the longitudinal direction of the extension portion 31 and bending a piece, which corresponds to a cut 31a having been formed by stamping, so that the piece protrudes.

In the present embodiment, different stamping directions are applied to the two motor-current-application terminals 3a, 3b so that the capacitor contact portions 10, 10 are arranged to be line-symmetric to each other with respect to the reference line L1.

That is, as shown in FIGS. 4A to 4E, for the motor-current-application terminal 3a, stamping is performed so that the front portion side of the extension portion 31 is cut and bent to protrude to the right side, having the rear side portion be the root end. Further, as shown in FIGS. 5A to 5E, for the motor-current-application terminal 3b, stamping is performed so that the rear portion side of the extension portion 31 is cut and bent to protrude to the left side, having the front side portion be the root end of bending.

Thus, in a state that the motor-current-application terminals 3a, 3b are arranged in the housing 2, the capacitor contact portions 10, 10 are disposed with a gap therebetween which enables sandwiching the capacitor 4 along the front/rear direction.

As shown in FIG. 7, the lower edge portion 31d (see FIGS. 4A to 4E) of the extension portion 31 of the motor-current-application terminal 3a can be inserted into the cutout portion 22b of the housing portion 221 of the terminal housing portion 22. Likewise, the lower edge portion 31d (see FIGS. 5A to 5E) of the extension portion 31 of the motor-current-application terminal 3b can be inserted into the cutout portion 22c of the housing portion 221.

Further, at the front end portion of the extension portion 31, there are provided a sandwiching portion (not shown) for sandwiching the electrical wire 38 and a press-fitting portion to which the exposed conductive portion of the wire is press-fitted.

The method for connecting the electrical wires 38 to the motor-current-application terminals 3a to 3d is not limited to press-fitting. A method which enables electrical connection such as press-contact, soldering, or pressing, etc. can be used appropriately.

Further, at the rear end portion of the extension portion 31, a jetty portion (not shown) which functions as a leg portion may be provided in order to increase the stability of the motor-current-application terminals 3a to 3d.

At the rear end portion of the extension portion 31, there is arranged an engagement receiving portion at which a hook portion (not shown) arranged inside the terminal housing portion 22 can be engaged. The motor-current-application terminals 3a to 3d are fixed at predetermined positions in the terminal housing portion 22 by this engagement.

Fitting of the motor-current-application terminals 3a, 3b and the capacitor 4 to the terminal housing portion 22 will be described below.

First, the motor-current-application terminal 3a is fitted to the terminal housing portion 22. At the time of fitting, the motor-current-application terminal 3a is moved close to the opening 22a of the terminal housing portion 22 in a state that the standing portion 32 faces the opening 22a; while the standing portion 32 is thus moved to be inserted into the gap 222a, the position of the lower edge portion 31d of the extension portion 31 is adjusted to the position of the cutout portion 22b and inserted into the cutout portion 22b; and further, the capacitor contact portion 10 is inserted into the gap between the recessed groove portion 225 and the lid portion 222.

Then, the motor-current-application terminal 3a is pushed in along the gap 222a and the cutout portion 22b. In this case, the motor-current-application terminal 3a is pushed in up to the position where the motor-current-application terminal 3a comes in contact with a contact portion (not shown) inside the terminal housing portion 22.

Thereafter, the capacitor 4 is inserted into the terminal housing portion 22 along the grooves 226, 227.

Then, another motor-current-application terminal 3b is fitted. Herein, while the standing portion 32 is moved to be inserted into the gap 222b, the position of the lower edge 11d of the extension portion 31 is adjusted to the position of the cutout portion 22c and inserted, and further the capacitor contact portion 10 is inserted between the recessed groove 225 and the lid portion 222.

Thereafter, the motor-current-application terminal 3b is pushed in along the gap 222b and the cutout portion 22c. The capacitor 4 is thereby sandwiched along the front/rear direction by the capacitor contact portions 10, 10 of the motor-current-application terminals 3a, 3b, and the motor-current-application terminals 3a, 3b and the capacitor 4 are electrically connected (see FIG. 6).

The motor-current-application terminals 3a, 3b are fixed at predetermined positions in the terminal housing portion 22 by engaging hook portions (not shown) provided inside the terminal housing portion 22 in engagement receiving portions (not shown) provided at the extension portions 31, 31 respectively so that the state that the capacitor 4 is sandwiched by the capacitor contact portions 10, 10 is satisfactorily maintained.

As described above, in the connector 1 of the present embodiment, the capacitor contact portions 10 protrude from the motor-current-application terminals 3a to 3d. Accordingly, it is not necessary to fit capacitor contact portions, and a current can be applied to the capacitor 4 by a simple work of fitting the motor current application terminals 3a to 3d to the housing 2 respectively. Thus, it is possible to attain a reduction in the number of components and improvement in the fittability, which realizes a reduction in the cost.

Further, the capacitor 4 can be easily sandwiched between both of the capacitor contact portions 10 only by performing a fitting work from one direction. Accordingly, an excellent fittability can be attained, and a further reduction in the cost can be realized.

Further, in a state that the motor-current-application terminals 3a, 3b (3c, 3d) are fitted to the terminal housing portion 22 respective, since the capacitor contact portions 10, 10 are arranged to be line-symmetric to each other with respect to the reference line L1 passing through the center of the capacitor 4, both of the capacitor contact portions 10, 10 can be formed, for example, by the same device or tool and by the same process, which realizes a reduction in the cost.

Further, the capacitor contact portions 10, 10 can hold the capacitor 4 with an appropriate balance. Both of the capacitor contact portions 10, 10 can accordingly maintain a satisfactory contact with the capacitor 4.

Further, the left side motor-current-application terminal 3a can be formed by cutting partially and bending a piece to protrude to the right side of the extension portion 31, and the right side motor-current-application terminal 3b can be formed by cutting partially and bending a piece to protrude to the left side of the extension portion 31. Thus, standardization of machined parts for the motor-current-application terminals 3a to 3d can be attained to realize a reduction in the cost.

Second Embodiment

With reference to FIGS. 9 to 15, a second embodiment according to the present invention will be described. In the figures referred to, the same symbol will be assigned to an element common to one in the first embodiment, and description of the element will be omitted.

The present embodiment is different from the first embodiment in that, in a state that two motor-current-application terminals 3a, 3b are arranged in the housing 2, capacitor contact portions 40, 40 are arranged to be line-symmetric to each other with respect to a reference line L2 (a line parallel to the upper surface of the base portion 21 (see FIG. 15) and passing through the center O of a capacitor 4). Thus, the two capacitor contact portions 40, 40 are disposed in parallel along the left/right direction perpendicular to the reference line L2 to sandwich the capacitor 4, along the left/right direction.

Since the terminal housing portions 22, 22 have similar structures on the left and on the right in the present embodiment also, one (on the right side) terminal housing portion 22 where the motor-current-application terminals 3a, 3b (see FIG. 13) are arranged will be described below.

Figure 10A:
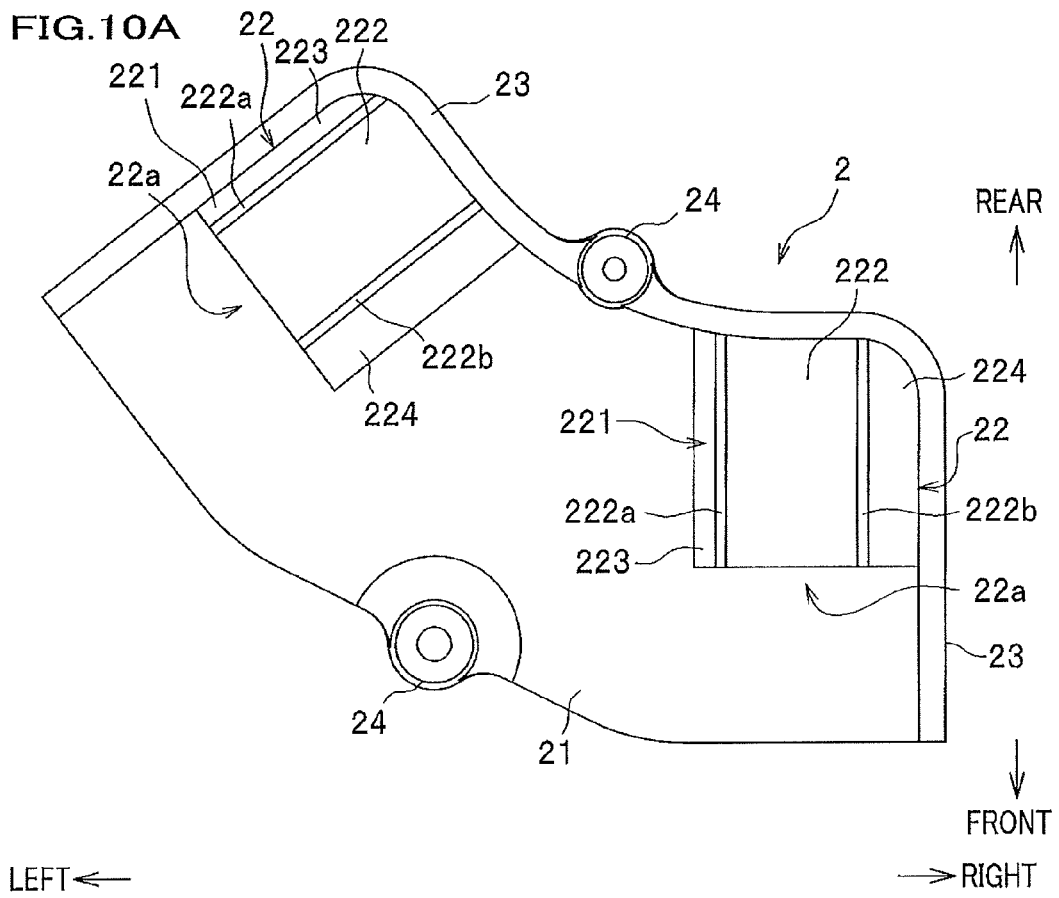
FIG. 10A is a plan view showing a housing.
Figure 10B:
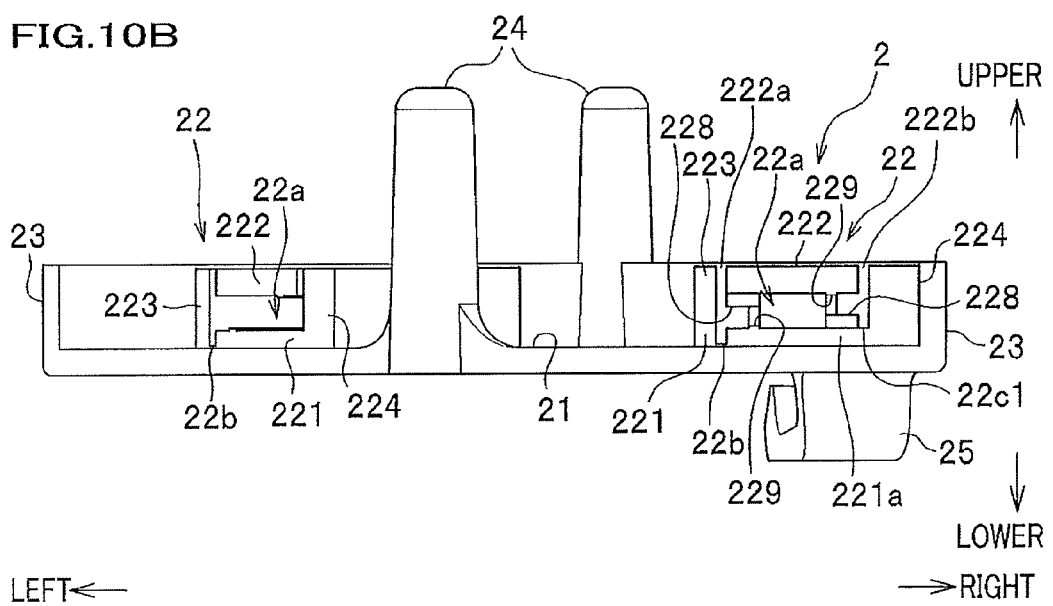
FIG. 10B is a front view of the same.

As shown in FIG. 10B, the terminal housing portion 22 is in a box shape provided with an opening 22a on the front surface side, and includes a housing portion 221 substantially in a U-shape in a front view and a lid portion 222 disposed facing the surface of the housing portion 221.

At a bottom portion 221a of the housing portion 221, formed are a protrusion portion 228 extending along the front/rear direction, a limb portion 229 extending along the front/rear direction, and a cutout portion 22b.

The protrusion portion 228 functions as an insertion guide of the extension portion 31 when the motor-current-application terminal 3b is housed into the terminal housing portion 22. Further, an auxiliary contact portion 33, described later, contacts with the front surface of the protrusion portion 228.

The limb portion 229 functions as an insertion guide of the capacitor 4 when the capacitor 4 is housed into the terminal housing portion 22. When the capacitor 4 is moved to be housed, one end surface (short surface) in the longitudinal direction of the capacitor 4 can be moved along the limb 229.

When the motor-current-application terminal 3a is moved to be housed into the terminal housing portion 22, a lower edge portion 31d (see FIG. 11A) of the extension portion 31 is inserted into the cutout portion 22b.

On the lower surface of the lid portion 222, formed are a protrusion portion 228 similar to the protrusion portion 228 of the bottom portion 221a of the housing portion 221, and a limb 229. The protrusion portions 228 and the limbs 229 of the lid portion 222 and the bottom portion 221a are formed at respective positions which are line-symmetric to each other with respect to the above-described reference line L2 (see FIG. 9, FIG. 14).

The protrusion portion 228 of the lid portion 222 functions as an insertion guide of the extension portion 31 when the motor-current-application terminal 3a is moved to be housed into the terminal housing portion 22. Further, the later-described auxiliary contact portion 33 contacts with the front surface of the protrusion portion 228.

When the capacitor 4 is moved to be housed into the terminal housing portion 22, another end surface (another short surface) in the longitudinal direction of the capacitor 4 can be moved along the limb 229.

That is, by the limb 229 of the bottom portion 221a of the housing portion 221 and the limb 229 of the lid portion 222, the capacitor 4 is held between the bottom portion 221a and the lid portion 222, having the longitudinal direction thereof be along the direction perpendicular to the above-described line L2. Thus, the bottom portion 221a and the lid portion 222 face each other along the lower/upper direction with a gap corresponding to the size in the short-length-direction of the capacitor 4.

Figure 14:
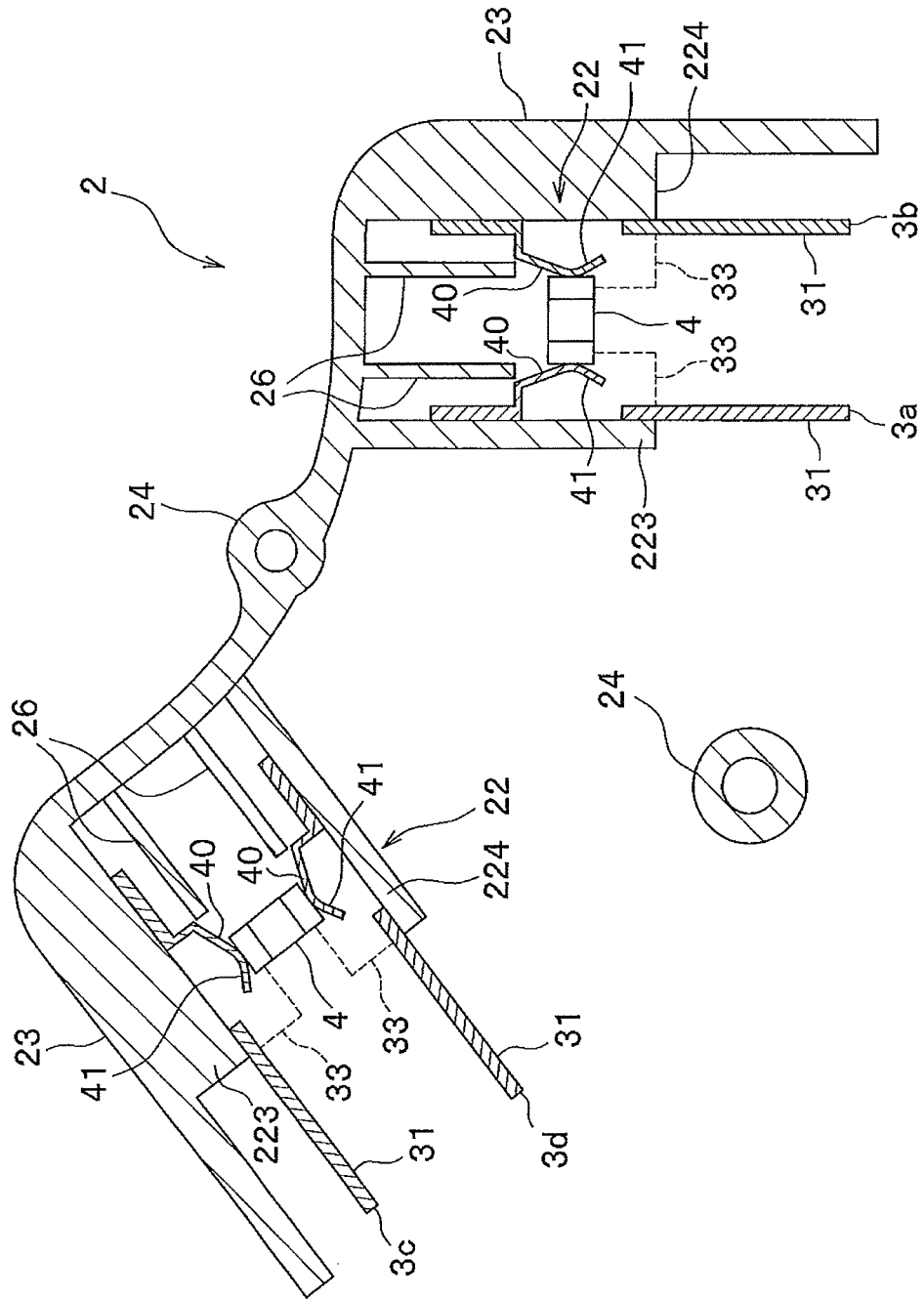
FIG. 14 is an end view taken along line B-B in FIG. 13.

As shown in FIG. 14, inside the terminal housing portion 22, contact portions 26, 26 are provided to define the positions of the rear end positions of the motor-current-application terminals 3a, 3b having been inserted through the opening 22a. Further, on the bottom portion 221a and on the inner surface of the lid portion 222, protrusions (not shown) are provided to press the rear side of the capacitor 4.

The two motor-current-application terminals 3a, 3b are made of a plate-shaped conductive material and are provided with the extension portions 31 and standing portions 32 respectively. The capacitor contact portions 40, 40 are formed integrally with and protrude from the extension portions 31, 31 respectively. Otherwise, capacitor contact portions capacitor contact portion 40, 40 may be made of a different material and fitted to the extension portions 31.

As shown in FIG. 9 and FIG. 15 and the like, the capacitor contact portions 40, 40 protrude along the direction in which the motor-current-application terminals 3a, 3b face each other. The capacitor contact portions 40, 40 are arranged to be line-symmetric to each other with respect to the reference line L2 passing through the center O of the capacitor 4. That is, in a state the motor-current-application terminals 3a, 3b are arranged in the housing 2, the two capacitor contact portions 40, 40 are arranged to be line-symmetric to each other with respect to the reference line L2 passing through the center O of the capacitor 4, wherein the reference line L2 is a line (a line parallel to the extension portions 31) which is parallel to the upper surface of the base portion 21 and passes through the center O of the capacitor 4 (see FIG. 15). Accordingly, there is a relationship that, when one capacitor contact portion 40 were rotated by 180 degrees (in front view shown in FIG. 13) around the axis of symmetry (reference line L2), the one capacitor contact portion 40 would overlap with another capacitor contact portion 40.

The capacitor contact portions 40, 40 are made of a plate-shaped piece which is substantially in a dogleg shape in plan view and in a size to be inserted between the housing portion 221 of the terminal housing portion 22 and the lid portion 222, wherein the respective arced-shaped protrusion portions 41, 41 of the capacitor contact portions 40, 40 contact the side surfaces (both short surfaces) of the capacitor 4. Such a capacitor contact portion 40 can be formed, for example, by stamping the extension portion 31 along the longitudinal direction of the extension portion 31 and bending a piece, which corresponds to a cut 31a having been formed by stamping, so that the piece protrudes.

In the present embodiment, the stamping direction is made common to the two motor-current-application terminals 3a, 3b so that the capacitor contact portions 40, 40 are arranged to be line-symmetric to each other with respect to the reference line L2.

That is, as shown in FIGS. 11A to 12E, the front portion side of the extension portion 31 is cut and bent to protrude to the right side, having the rear side of the extension portion 31 be the root end of bending.

Thus, in a state that the motor-current-application terminals 3a, 3b are arranged in the housing 2, the capacitor contact portions 40, 40 are disposed with a gap therebetween which enables sandwiching the capacitor 4 along the left/right direction.

Figure 12A:
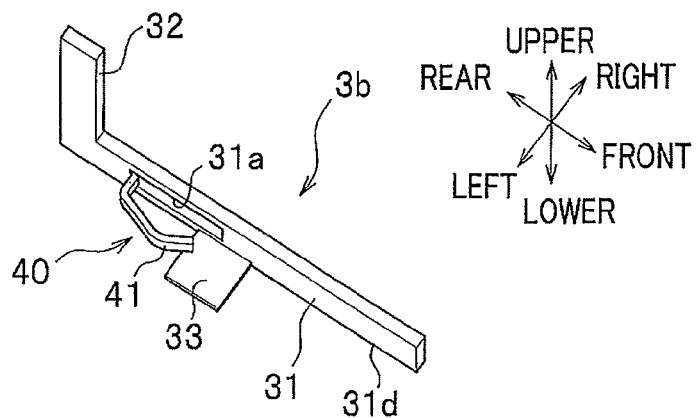
Figure 12C:
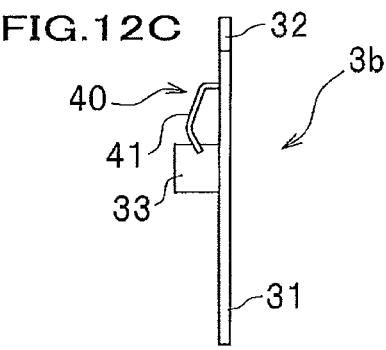
Figure 12D:
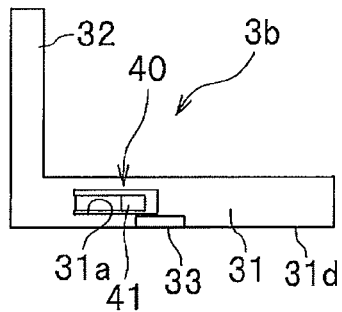
Figure 12B:
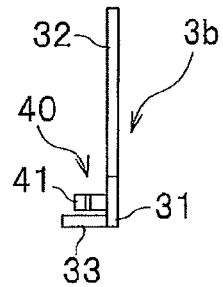
Figure 12E:
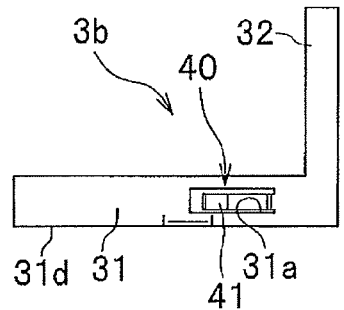
Figure 12F:
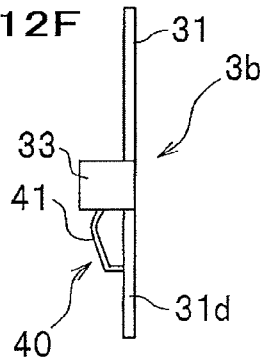
Figure 13:
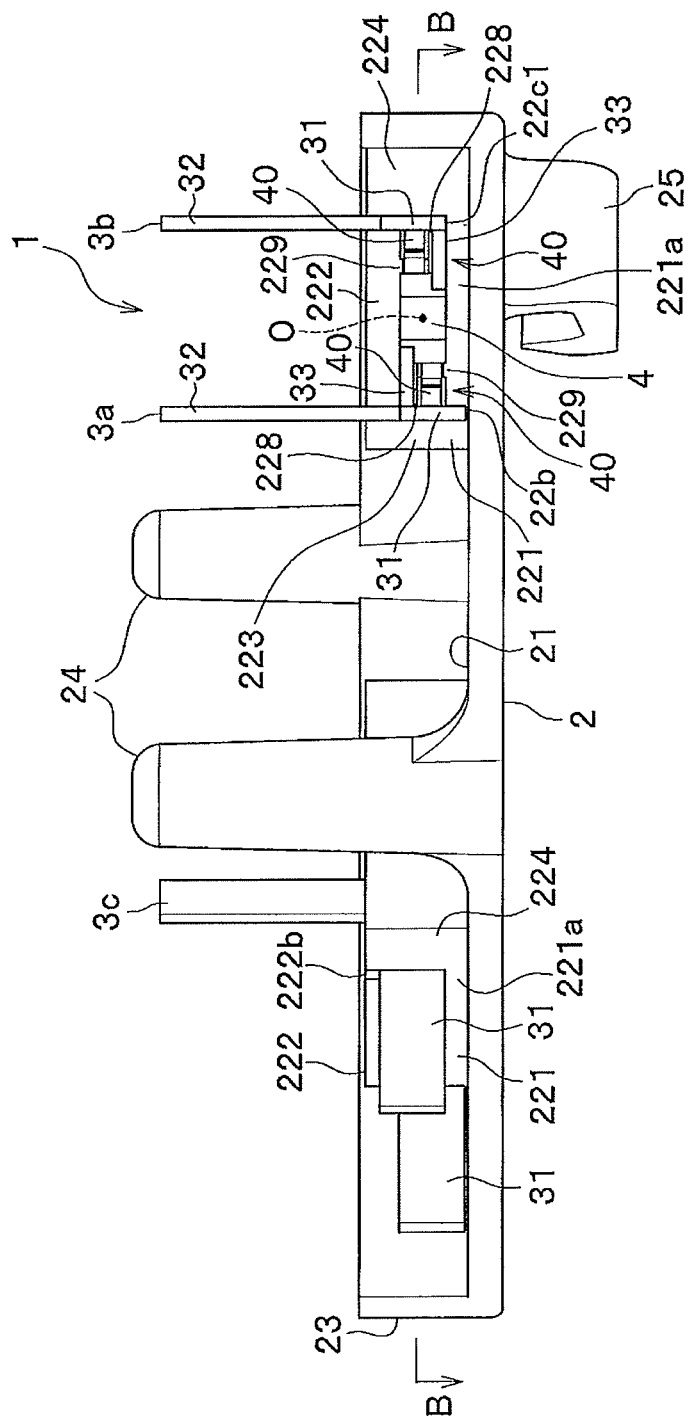
FIG. 13 is a front view of the power feed connector.

As shown in FIG. 13, the lower edge portion 31d (see FIGS. 11A to 11D) of the extension portion 31 of the motor-current-application terminal 3a can be inserted into the cutout portion 22b of the housing portion 221 of the terminal housing portion 22. Likewise, the lower edge portion 31d (see FIGS. 12A to 12E) of the extension portion 31 of the motor-current-application terminal 3b can be inserted into a groove portion 22c1 firmed between the protrusion portion 228 of the housing portion 221 and the right wall portion 224.

Figure 11A:
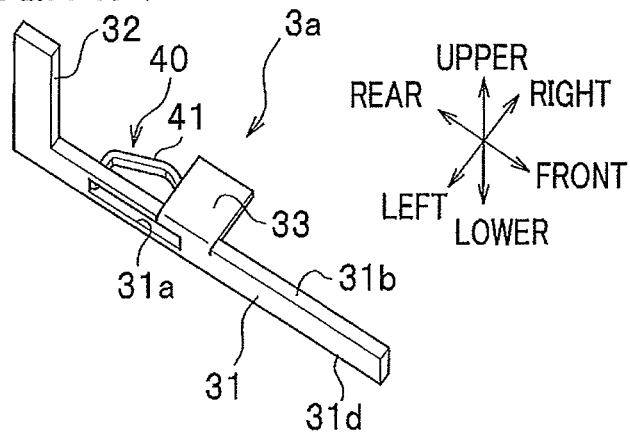
Figure 11C:
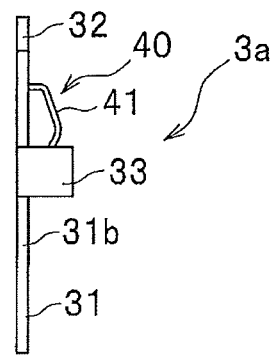
Figure 11D:
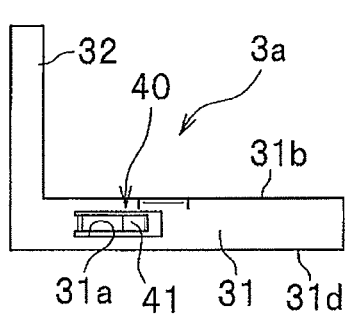
Figure 11B:
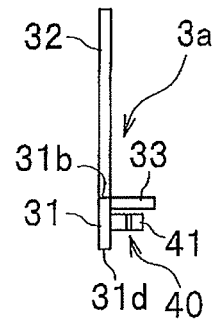
Figure 11E:
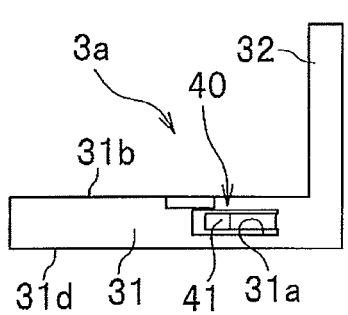
Figure 11F:
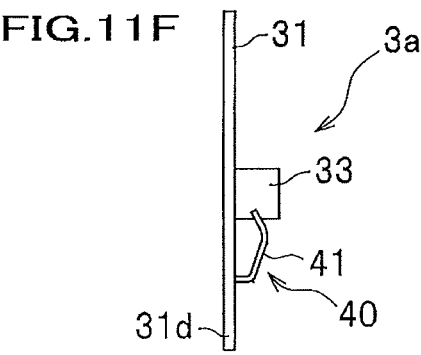

As shown in FIGS. 11C and 12C, the auxiliary contact portion 33 is substantially in a rectangular shape in a plan view, and integrally protrudes from the extension portion 31 on the same side as the side where the capacitor contact portion 40 protrudes. As shown in FIG. 15, the auxiliary contact portion 33 of the motor-current-application terminal 3a is formed by cutting and bending a part of an upper margin of 31b of the extension portion 31, wherein the upper margin 31b and the upper surface of the auxiliary contact portion 33 are substantially on the same plane (see FIGS. 11B, 11D, and 11E). Further, the auxiliary contact portion 33 of the motor-current-application terminal 3b is formed by cutting and bending a part of an lower margin of 31d of the extension portion 31, wherein the lower margin 31d and the lower surface of the auxiliary contact portion 33 are substantially on the same plane (see FIGS. 12B, 12D, and 12E).

As shown in FIGS. 13 and 15, the auxiliary contact portions 33 contact with the front surfaces of the housing portion 221 and the protrusion portion 228 of the lid portion 222, and the side surface (long surface (front surface)) of the capacitor 4 in a state that the motor-current-application terminals 3a, 3b are fitted to the terminal housing portion 22.

Fitting of the motor-current-application terminals 3a, 3b and the capacitor 4 to the terminal housing portion 22 will be described below. First, through the opening 22a of the terminal housing portion 22, the capacitor 4 is inserted into the gap between the limb 229 of the bottom portion 221a of the housing portion 221 and the limb 229 of the lid portion 222.

Thereafter, through the opening 22a of the terminal housing portion 22, one (on the left side) motor-current-application terminal 3a is fitted. At the time of fitting, the motor-current-application terminal 3a is moved close to the opening 22a of the terminal housing portion 22 in a state that the standing portion 32 faces the opening 22a; while the standing portion 32 is thus moved to be inserted into the gap 222a, the position of the lower edge portion 11d of the extension portion 31 is adjusted to the position of the cutout portion 22b and inserted into the cutout portion 22b; and further, the capacitor contact portion 40 is inserted into the gap between the housing portion 221 and the protrusion portion 228 of the lid portion 222. Thus, the capacitor contact portion 40 of the motor-current-application terminal 3a contacts with the left short surface of the capacitor 4.

Then, through the opening 22a of the terminal housing portion 22, another (the right side) motor-current-application terminal 3b is fitted. At the time of fitting, the motor-current-application terminal 3b is moved close to the opening 22a of the terminal housing portion 22 in a state that the standing portion 32 faces the opening 22a; while the standing portion 32 is thus moved to be inserted into the gap 222b, the position of the lower edge portion 11d of the extension portion 31 is adjusted to the position of the cutout portion 22c and inserted into the cutout portion 22c; and further, the capacitor contact portion 40 is inserted into the gap between the protrusion portion 228 of the housing portion 221 and the lid portion 222. Thus, the capacitor contact portion 40 of the motor-current-application terminal 3b contacts with the right short surface of the capacitor 4. Consequently, the capacitor 4 is sandwiched by the capacitor contact portions 40, 40, and the capacitor contact portions 40, 40 and the capacitor 4 are electrically connected (see FIG. 15).

Further, the auxiliary contact portions 33, 33 of the left and right motor-current-application terminals 3a, 3b contact with the side surface (long surface (front surface)) of the capacitor 4. Thus, the side surface of the capacitor 4 is urged by the auxiliary contact portions 33, 33, and the capacitor 4 is prevented from deviating from a predetermined position of the terminal housing portion 22 (dropping off from the opening 22a).

In addition to the advantages described in the first embodiment, for the connector 1 having been described above in the present embodiment, also with a structure having the auxiliary contact portions 33, both of the capacitor contact portions 40, 40 can be formed, for example, by the same device or tool and by the same process, which realizes a reduction in the cost.

Further, the capacitor 4 can be prevented by the auxiliary contact portions 33 from deviating from a predetermined position of the housing 2.

Still further, since the auxiliary contact portions 33 are arranged to be line-symmetric to each other with respect to the reference line L2 passing through the center O of the capacitor 4, the capacitor 4 can be held (urged) with an appropriate balance.

In the first embodiment, the arrangement is made such that the capacitor contact portion 10 of the motor-current-application terminal 3a protrudes to the right side from the rear portion side of the extension portion 31, and the capacitor contact portion 10 of the motor-current-application terminal 3b protrudes to the left side from the front portion side of the extension portion 31. However, without being limited thereto, an arrangement may be made such that the capacitor contact portion 10 of the motor-current-application terminal 3a protrudes to the right side from the front portion side of the extension portion 31, and the capacitor contact portion 10 of the motor-current-application terminal 3b protrudes to the left side from the rear portion side of the extension portion 31.

Further, although, capacitor contact portions 10, 40 formed by stamping have been described in the first and second embodiments, without being limited thereto, capacitor contact portions 10, 40 may be integrally extended from the end portions of the extension portions 31, etc. respectively.

Further, although, in the second embodiment, auxiliary contact portions 33 in a rectangular shape in a plan view have been described, without being limited thereto, it is possible to use a variety kinds of auxiliary contact portions 33 which contact with the side surface (long surface (front surface)) of the capacitor 4 from the opening 22a side and can urge the capacitor 4 from the fitting direction.

Still further, although the capacitor contact portions 10, 40 those are arranged to be line-symmetric to each other have been described, without being limited thereto, capacitor contact portions 10, 40 may have shapes different from each other to sandwich the capacitor 4.

Yet further, although, in the foregoing embodiments, power feed connectors which are applied to the first and second motors M1, M2 of a mirror-surface-angle adjustment mechanism have been described, without being limited thereto, the present invention can also be adopted for power feed connectors for, for example, different actuators, devices, or the like mounted on an automobile (vehicle).

What is claimed is:

1. A power feed connector for feeding power to a motor of an actuator, the power feed connector comprising:
   two motor current application terminals, each comprising a corresponding extension portion and a corresponding connection portion, and wherein the two motor current application terminals are configured to apply a current to the motor;
   two capacitor contact portions, each of which protrude from the corresponding extension portion;
   a capacitor that contacts each of the two capacitor contact portions so as to apply a current to the two motor current application terminals via the two capacitor contact portions; and
   a housing in which the two motor current application terminals, the two capacitor contact portions, and the capacitor are provided,
   wherein each of the two motor current application terminals and a corresponding one of the two capacitor contact portions constitute first and second terminal members, respectively, and
   wherein the first and second terminal members are configured to be separately inserted into the housing from each other; and the two capacitor contact portions being spaced apart from each other to define a gap in which the capacitor is positioned and resiliently sandwiched by the two capacitor contact portions, wherein the two capacitor contact portions being spaced apart from each other in a longitudinally extending direction of the corresponding extension portion to define the gap.

2. The power feed connector according to claim 1, further comprising the two capacitor contact portions being arranged to be line-symmetric to each other with respect to a reference line passing through a center of the capacitor.

3. The power feed connector according to claim 2, further comprising:
auxiliary contact portions, each of which protrude from the corresponding extension portion to the same side that a corresponding one of the two capacitor contact portions protrudes, and contacts with a side surface of the capacitor,
wherein the reference line passing through a center of the capacitor is parallel to a longitudinally extending direction of the corresponding extension portion.

4. The power feed connector according to claim 3, further comprising the auxiliary contact portions being arranged to be line-symmetric to each other with respect to the reference line.

5. The power feed connector according to claim 1, wherein each of the two capacitor contact portions are formed integrally with the corresponding extension portion of each of the motor current application terminals.

* * * * *